United States Patent
Lee

(10) Patent No.: US 10,913,438 B2
(45) Date of Patent: Feb. 9, 2021

(54) MASTER CYLINDER OF BRAKE FOR VEHICLE

(71) Applicant: HYUNDAI MOBIS CO., LTD., Seoul (KR)

(72) Inventor: Sang Mok Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 16/357,637

(22) Filed: Mar. 19, 2019

(65) Prior Publication Data

US 2020/0010067 A1 Jan. 9, 2020

(30) Foreign Application Priority Data

Jul. 6, 2018 (KR) .................. 10-2018-0078554

(51) Int. Cl.
| | | |
|---|---|---|
| *B60T 13/74* | (2006.01) | |
| *B60T 8/36* | (2006.01) | |
| *B60T 11/236* | (2006.01) | |
| *B60T 11/20* | (2006.01) | |

(52) U.S. Cl.
CPC ............ *B60T 13/741* (2013.01); *B60T 8/36* (2013.01); *B60T 11/20* (2013.01); *B60T 11/236* (2013.01); *B60Y 2304/07* (2013.01)

(58) Field of Classification Search
CPC ........ B60T 7/042; B60T 11/20; B60T 11/102; B60T 11/165; B60T 11/236; B60T 13/662; B60T 13/741; B60T 13/745; B60T 8/36; B60T 8/4018; B60Y 2304/07
See application file for complete search history.

(56) References Cited

U.S. PATENT DOCUMENTS

| | | | | |
|---|---|---|---|---|
| 4,109,976 A | * | 8/1978 | Koch | F16C 23/045 277/504 |
| 5,833,106 A | * | 11/1998 | Harris | B65H 23/038 226/17 |
| 6,176,352 B1 | * | 1/2001 | Maron | B60T 13/741 188/1.11 E |

(Continued)

FOREIGN PATENT DOCUMENTS

| | | |
|---|---|---|
| KR | 10-2015-0005989 A | 1/2015 |
| KR | 10-2015-0047977 A | 5/2015 |

(Continued)

OTHER PUBLICATIONS

"Hyundai 'NexSo' records 1061 reservation in 6 days", chosun.com—4 pages (Mar. 27, 2018).

(Continued)

*Primary Examiner* — Vishal R Sahni
(74) *Attorney, Agent, or Firm* — Knobbe Martens Olson & Bear LLP

(57) ABSTRACT

A master cylinder of a brake for a vehicle may include: a housing having a port through which oil is transferred; a motor connected to the housing so as to supply rotary power; a screw rotatably installed in the motor, and rotated by the rotary power received from the motor; a moving piston engaged with the outside of the screw, and moved in the longitudinal direction of the housing by the rotation of the screw; and a fixed piston fixed to the inside of the housing, and having the moving piston positioned on the outside thereof.

10 Claims, 4 Drawing Sheets

(56) References Cited

U.S. PATENT DOCUMENTS

| | | | | |
|---|---|---|---|---|
| 6,325,182 | B1* | 12/2001 | Yamaguchi | B60T 13/741 |
| | | | | 188/162 |
| 8,622,644 | B2* | 1/2014 | Becker | F16C 11/045 |
| | | | | 403/134 |
| 9,080,623 | B2* | 7/2015 | No | F16D 65/18 |
| 2015/0076972 | A1* | 3/2015 | Leiber | H02K 7/08 |
| | | | | 310/68 B |
| 2015/0322931 | A1* | 11/2015 | Weh | H02K 7/06 |
| | | | | 417/415 |
| 2019/0100172 | A1* | 4/2019 | Lee | F16H 25/2015 |

FOREIGN PATENT DOCUMENTS

| | | |
|---|---|---|
| KR | 10-2015-0060380 A | 6/2015 |
| KR | 10-20016-0095486 A | 6/2016 |

OTHER PUBLICATIONS

"NexSo' FE FCEV Instruction Manual", <http://www.hyundai.com/files/kr/ko/lib/2018/11/12/20181112154208751738.pdf—115 pages (Nov. 12, 2018).

Office Action of corresponding Korean Patent Application No. 10-2018-0078554—7 pages (dated Dec. 26, 2019).

* cited by examiner

MASTER CYLINDER OF BRAKE FOR VEHICLE

CROSS-REFERENCES TO RELATED APPLICATIONS

The present application claims priority to Korean application number 10-2018-0078554, filed on Jul. 6, 2018, which is incorporated by reference in its entirety.

BACKGROUND OF THE INVENTION

The present invention relates to a master cylinder of a brake for a vehicle, and more particularly, to a master cylinder of a brake for a vehicle, which can compensate for the coaxiality of a part positioned on the same axis as the rotation center axis of a motor rotating part, and compensate for the right angle degree of a screw rotating shaft, thereby improving operation reliability.

In general, a master cylinder of a brake for a vehicle generates a braking force to restrict the movement of wheels, using a hydraulic force which is generated when a piston within the master cylinder is moved.

When a driver steps on a pedal, required braking pressure is decided. Thus, the master cylinder is operated to implement the required braking pressure, and the hydraulic force generated by the master cylinder is transferred to each of the wheels.

Since the conventional master cylinder is operated by a hydraulic force, the master cylinder has difficulties in precisely moving the piston to implement a braking force. In order to solve such a problem, a method for moving a piston using rotary power of a motor has been designed. In this method, however, the coaxiality of a part positioned on the same axis such as the rotation center axis of a motor rotating part may not be matched to cause friction and interference between the parts. Therefore, there is a demand for a structure capable of solving the problem.

The related art of the present invention is disclosed in Korean Patent Publication No. 2016-0095486 published on Aug. 11, 2016 and entitled "Master cylinder of brake for vehicle".

SUMMARY OF THE INVENTION

Embodiments of the present invention are directed to a master cylinder of a brake for a vehicle, which can precisely implement braking pressure, and compensate for the coaxiality and right angle degree of a part positioned on the same axis as the rotation center axis of a motor rotating part, thereby improving operation reliability.

In one embodiment, a master cylinder of a brake for a vehicle may include: a housing having a port through which oil is transferred; a motor connected to the housing so as to supply rotary power; a screw rotatably installed in the motor, and rotated by the rotary power received from the motor; a moving piston engaged with the outside of the screw, and moved in the longitudinal direction of the housing by the rotation of the screw; and a fixed piston fixed to the inside of the housing, and having the moving piston positioned on the outside thereof.

The motor may include: a fixed part fixed to the housing and having magnetism changed by power supply; and a motor rotating part connected to the screw, rotated with the screw, and rotated according to the change in magnetism of the fixed part.

The fixed part may include: a fixed frame fixed to one side of the housing; and a stator installed in the fixed frame facing the motor rotating part, and configured to generate magnetism.

The motor rotating part may include: a rotating frame rotatably installed in the fixed frame, and installed in a shape to cover an end of the moving piston; and a rotor installed outside the rotating frame facing the fixed part, and having magnetism.

The rotating frame and the screw may be spline-joined to transfer power.

A compensation gap may be provided between the rotating frame and the screw.

The master cylinder may further include a compensation part installed outside the screw passing through the rotating frame and configured to compensate for coaxiality between the rotating frame and the screw.

The compensation part may include: a compensation member positioned outside the screw and having a surface facing the rotating frame and a surface which does not face the rotating frame, wherein the surface facing the rotating frame is a flat surface and the surface which does not face the rotating frame forms a curved surface; and an inclination guide member having an inclined surface formed at a position facing the curved surface, and installed outside the screw while facing the compensation member.

The compensation part may further include an elastic deformation member installed between the compensation member and the rotating frame and formed of an elastically deformable material.

The master cylinder may further include a locking member fixed to the screw protruding to the outside of the rotating frame, and positioned outside the compensation part.

The screw may include: a screw body rotatably installed in the rotating frame and having a spiral gear formed on the outside thereof; and a screw rotating shaft extended from the screw body, passed through the compensation part and the rotating frame, and having the locking member fixed to the outside thereof.

The moving piston may include: a moving body installed in a shape to cover the outside of the screw body, and linearly moved by rotation of the screw body; and a piston member connected to the moving body extended to the inside of the housing, and configured to move oil between the housing and the fixed piston toward the port.

The fixed piston may be positioned on the same axis as the screw, and has one side positioned in the moving piston and the other side fixed to the housing.

In accordance with the embodiment of the present invention, the hydraulic pressure may be formed while the moving piston 50 is moved by the operation of the motor, which makes it possible to precisely implement braking pressure.

Furthermore, the compensation part and the compensation gap can compensate for the coaxiality and right angle degree between the moving piston and the screw which are positioned on the same axis as the rotation center axis of the motor rotating part, thereby improving the operation reliability.

Furthermore, since the moving piston also performs the function of the conventional piston, the external size of the device can be reduced to increase the spatial utilization, and the number of parts can be reduced to improve productivity.

DESCRIPTION OF SPECIFIC EMBODIMENTS

Hereafter, a master cylinder of a brake for a vehicle in accordance with an embodiment of the present invention will be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
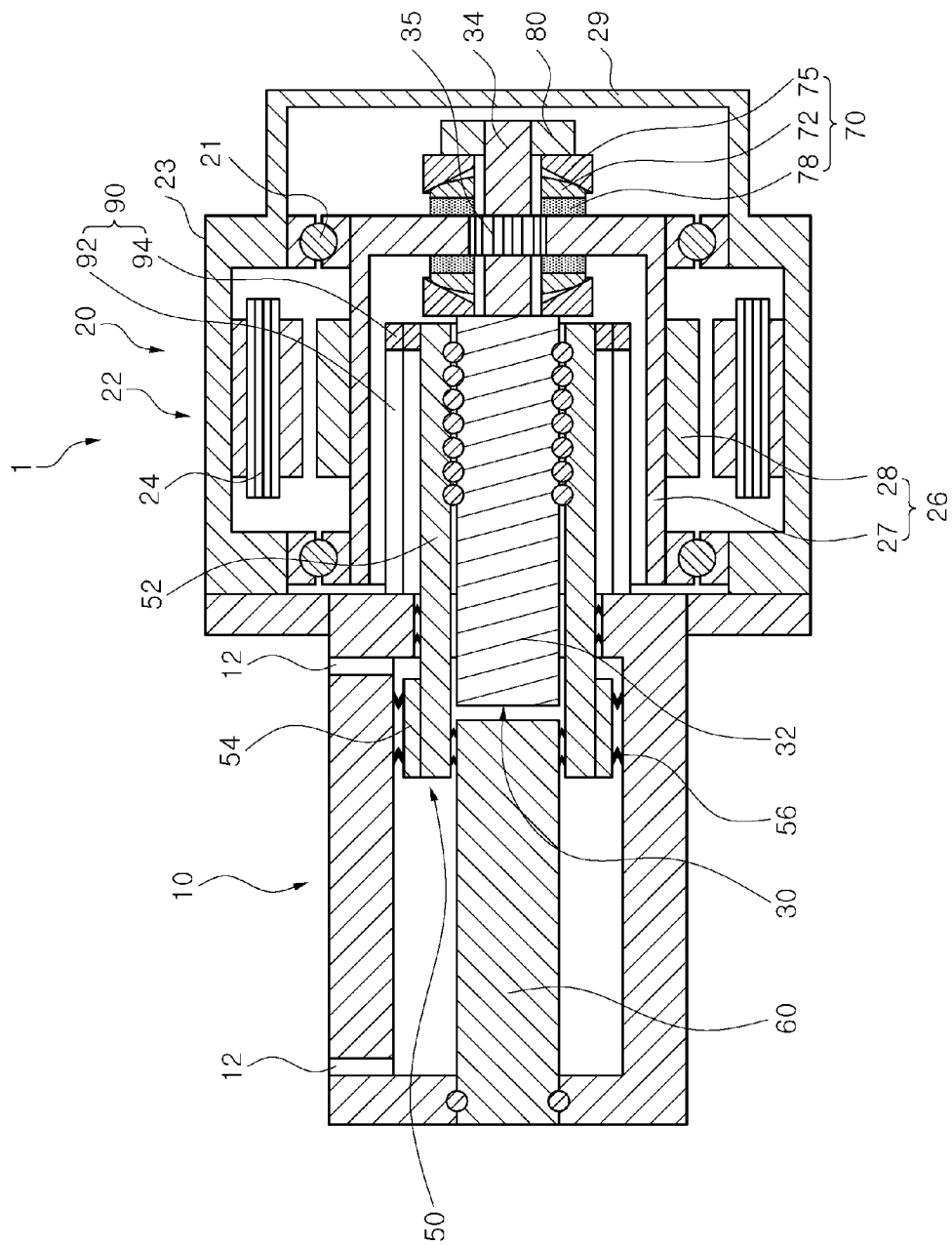
FIG. 1 is a cross-sectional view schematically illustrating a structure of a master cylinder of a brake for a vehicle in accordance with an embodiment of the present invention.
Figure 2:
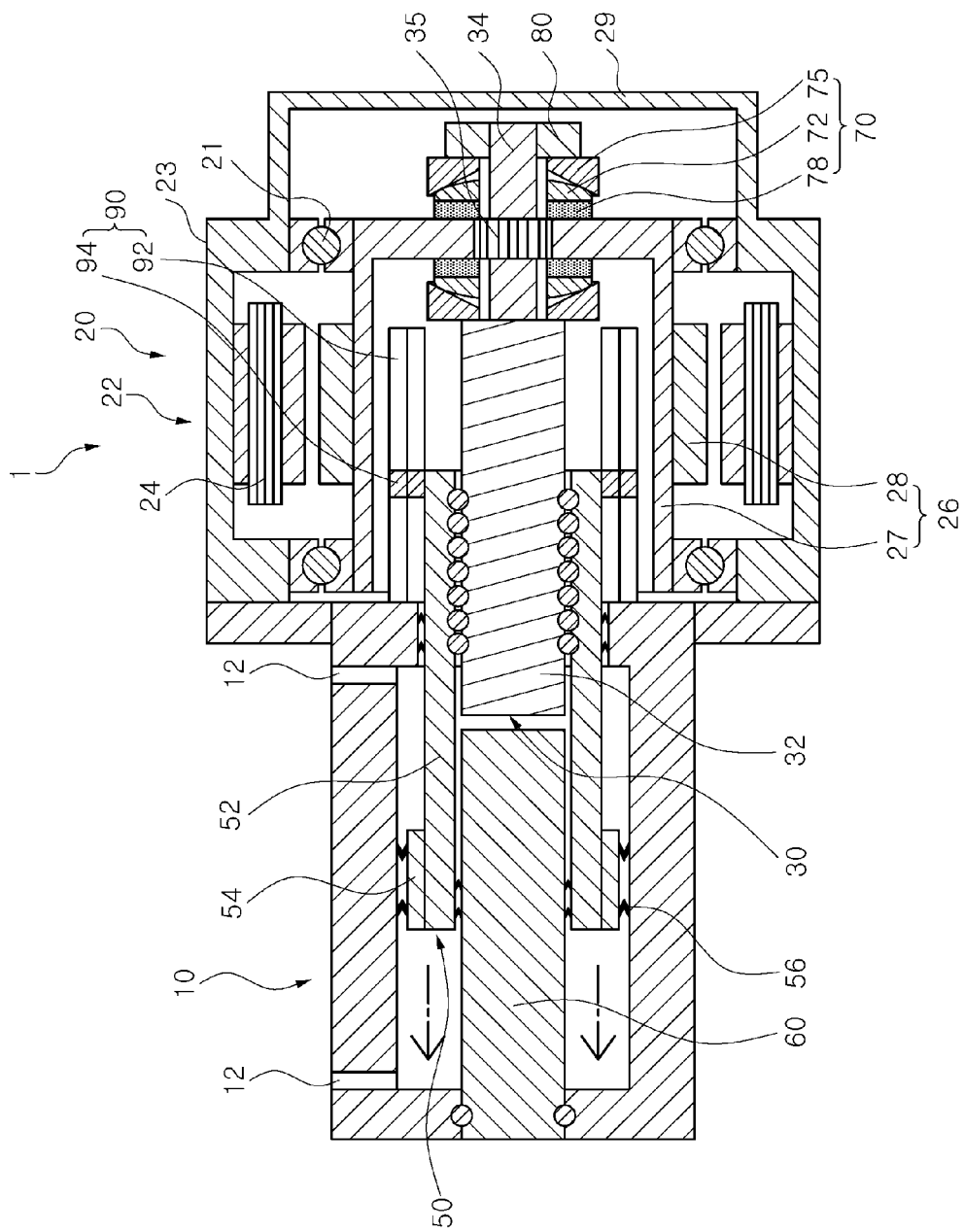
FIG. 2 is a cross-sectional view illustrating that a moving piston in accordance with the embodiment of the present invention is moved in the longitudinal direction of a housing.
Figure 3:
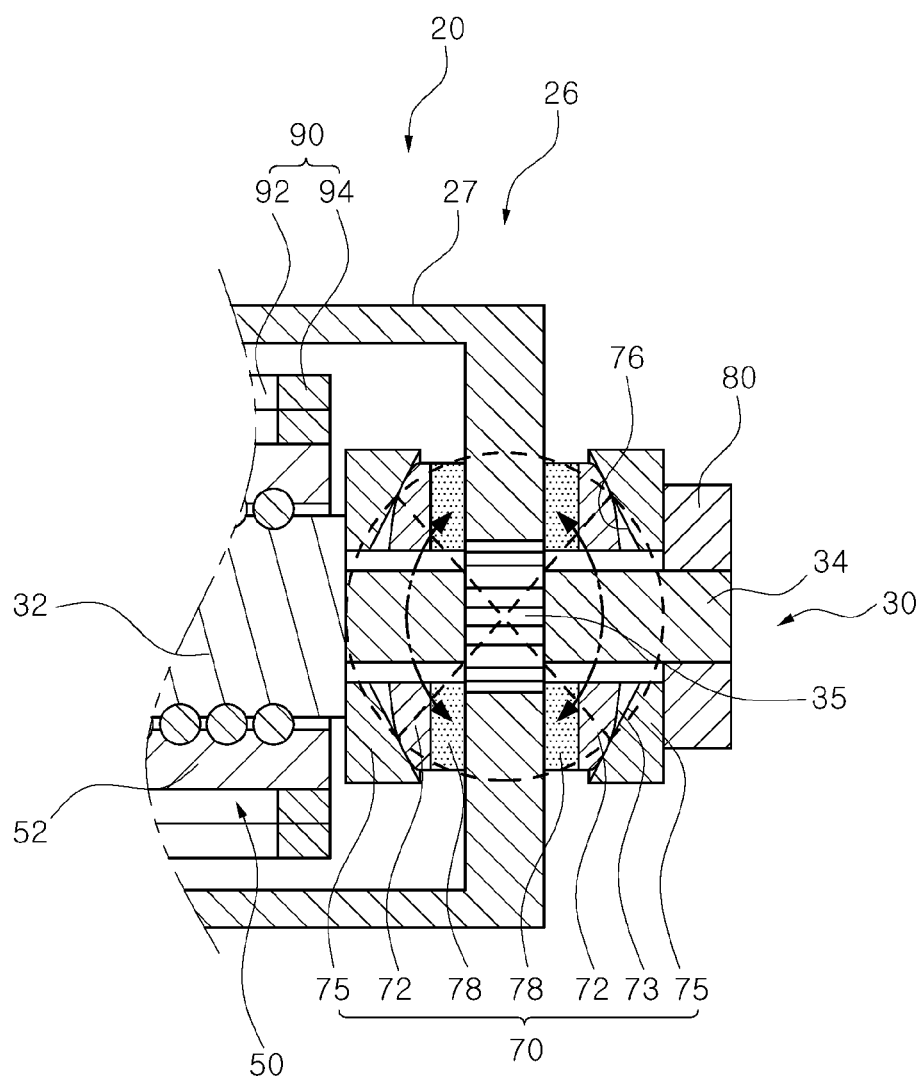
FIG. 3 is a cross-sectional view illustrating a compensation part in accordance with the embodiment of the present invention.
Figure 4:
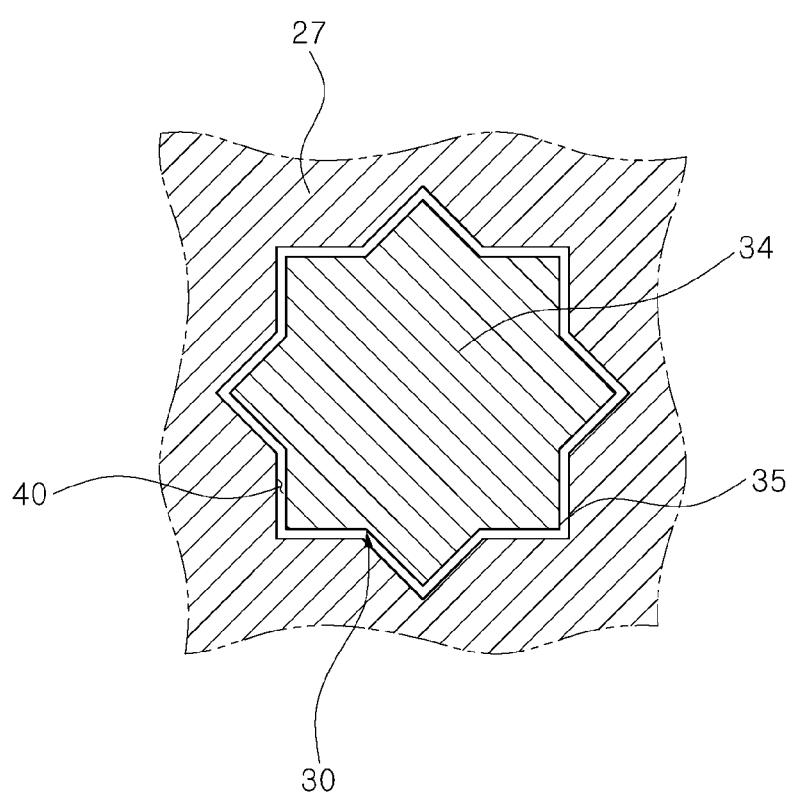
FIG. 4 is a cross-sectional view illustrating that a screw in accordance with the embodiment of the present invention is spline-joined to a motor rotating part.

FIG. 1 is a cross-sectional view schematically illustrating a structure of a master cylinder of a brake for a vehicle in accordance with an embodiment of the present invention, FIG. 2 is a cross-sectional view illustrating that a moving piston in accordance with the embodiment of the present invention is moved in the longitudinal direction of a housing, FIG. 3 is a cross-sectional view illustrating a compensation part in accordance with the embodiment of the present invention, and FIG. 4 is a cross-sectional view illustrating that a screw in accordance with the embodiment of the present invention is spline-joined to a motor rotating part.

As illustrated in FIG. 1, a master cylinder 1 of a brake for a vehicle in accordance with an embodiment of the present invention may include a housing 10, a motor 20, a screw 30, a moving piston 50 and a fixed piston 60. The housing 10 may have a port 12 through which oil is transferred. The motor 20 may be connected to the housing 10 so as to supply rotary power. The screw 30 may be rotatably installed in the motor 20, and rotated by the rotary power received from the motor 20. The moving piston 50 may be engaged with the outside of the screw 30, and moved in the longitudinal direction of the housing 10 by rotation of the screw 30. The fixed piston 60 may be fixed to the inside of the housing 10, such that the moving piston 50 is positioned outside the fixed piston 60.

A driver's operation of stepping on a pedal of the vehicle may decide required braking pressure. Thus, the master cylinder 1 of the brake for the vehicle may be operated to implement the required braking pressure, and hydraulic pressure generated at this time may be transferred to each wheel.

The port 12 through which oil is transferred may be formed on both sides of the housing 10 in the longitudinal direction thereof, and the housing 10 may have an operation space through which a piston member 54 of the moving piston 50 is moved. The oil transferred through the movement of the piston member 54 may be transferred through the port 12, thereby forming the required braking pressure.

The motor 20 may be connected to the housing 10 and include various types of driving devices, as long as the driving devices can supply rotary power. The motor 20 in accordance with the embodiment of the present invention may include a motor bearing part 21, a fixed part 22 and a motor rotating part 26.

The fixed part 22 may be fixed to the housing 10, and formed in various shapes as long as magnetism can be changed by the supply of power. In an embodiment, the fixed part 22 may include a fixed frame 23 fixed to one side of the housing 10 and a stator 24 installed in the fixed frame 23 facing the motor rotating part 26 and configured to generate magnetism.

The fixed frame 23 may be connected to one side of the housing 10, and the motor rotating part 26 may be rotatably installed in the fixed frame 23. The stator 24 which is an electromagnet may be installed in the fixed frame 23 in a circumferential direction, and rotate the motor rotating part 26 while magnetic fluxes are changed according to a control signal of a controller.

The motor rotating part 26 may be connected to the screw 30 and rotated with the screw 30. The motor rotating part 26 may be formed in various shapes as long as the motor rotating part 26 is rotated according to a change in magnetism of the fixed part 22. In an embodiment, the motor rotating part 26 may include a rotating frame 27 and a rotor 28. The rotating frame 27 may be rotatably installed in the fixed frame 23, and formed in a shape to cover an end of the moving piston 50, and the rotor 28 may be installed outside the rotating frame 27 facing the fixed part 22, and have magnetism.

Between the rotating frame 27 and the fixed frame 23, the motor bearing part 21 may be installed to reduce friction which occurs during the rotation of the rotating frame 27. Furthermore, the rotor 28 including a plurality of magnets installed in the circumferential direction of the rotating frame 27 may be rotated with the rotating frame 27 according to a change in magnetism of the stator 24.

Since a cover member 29 fixed to the fixed frame 23 is installed in a shape to cover the screw 30 protruding to the outside of the rotating frame 27 and the outside of a locking member 80, the cover member 29 may block foreign matters from flowing into the end of the screw 30.

The screw 30 may be rotatably installed in the motor 20 and formed in various shapes, as long as the screw 30 can be rotated by rotary power received from the motor 20. In an embodiment, the screw 30 may include a screw body 32 and a screw rotating shaft 34. The screw body 32 may be rotatably installed in the rotating frame 27 and have a spiral gear formed on the outside thereof. The screw rotating shaft 34 may be extended from the screw body 32, passed through the compensation part 70 and the rotating frame 27, and have the locking member 80 fixed to the outside thereof.

The screw rotating shaft 34 extended to the outside from the rotation center of the screw body 32 may have a smaller diameter than the screw body 32. As illustrated in FIG. 4, the screw rotating shaft 34 facing the rotating frame 27 may have a plurality of side protrusions 35 formed on the outside thereof. Thus, the rotating frame 27 and the screw 30 may be spline-joined to transfer power.

Between the rotating frame 27 and the screw 30, a compensation gap 40 may be provided. The compensation gap 40 may be formed as the side protrusions 35 formed on the screw 30 and the rotating frame 27 are spaced a predetermined distance apart from each other. Therefore, the screw 30 and the compensation part 70 may secure a degree of freedom in moving in the top-to-bottom direction. Thus, when the master cylinder 1 of the brake for the vehicle is assembled, the coaxiality among the housing 10, the screw 30 and the motor 20 may be compensated for.

As illustrated in FIGS. 1 and 2, the moving piston 50 may be engaged with the outside of the screw 30, and formed in various shapes as long as the moving piston 50 can be moved in the longitudinal direction of the housing 10 by the rotation of the screw 30. In an embodiment, the moving piston 50 may include a moving body 52, a piston member 54 and a sealing member 56.

The moving body 52 may be installed in a shape to cover the outside of the screw body 32, and linearly moved by the rotation of the screw body 32. One side of the moving body 52 may be positioned in the motor rotating part 26, and the other side of the moving body 52 may be positioned in the housing 10.

The piston member 54 may be connected to the moving body 52 extended into the housing 10, and move oil between the housing 10 and the fixed piston 60 toward the port 12. The piston member 54 may be formed in a ring shape, and fixed to the outside of the other end of the moving body 52. The piston member 54 and the moving body 52 may be formed as one body, or separately manufactured and then assembled into each other.

When the piston member 54 and the moving body 52 are formed as one body, a process of assembling the piston member 54 and the moving body 52 may be omitted, and the axial length of the master cylinder 1 may be reduced. Therefore, the numbers of parts and assembly processes and the axial length of the master cylinder 1 man be reduced, which makes it possible to obtain an effect such as system packaging improvement.

The sealing member 56 may be installed on a side surface of the moving body 52 and a side surface of the piston member 54, and moved with the moving body 52.

The fixed piston 60 may be fixed in the housing 10, and formed in various shapes as long as the moving piston 50 is positioned outside the fixed piston 60. In an embodiment, the fixed piston 60 may be positioned on the same axis as the screw 30, and have one side positioned in the moving piston 50 and the other side fixed to the housing 10. In an embodiment, the fixed piston 60 may have a cylindrical shape, and the rotation centers of the fixed piston 60, the screw 30 and the motor rotating part 26 may be positioned on the same axis.

The compensation part 70 may be installed outside the screw 30 passing through the rotating frame 27, and formed in various shapes as long as the compensation part 70 can compensate for the coaxiality between the rotating frame 27 and the screw 30. In an embodiment, the compensation part 70 may include a compensation member 72, an inclination guide member 75 and an elastic deformation member 78.

The compensation member 72 may be positioned outside the screw 30, and have a surface which faces the rotating frame 27 and a surface which does not face the rotating frame 27. The surface which faces the rotating frame 27 may be formed as a flat surface, and the surface which does not face the rotating frame 27 may be formed as a curved surface 73. In an embodiment, the compensation member 72 may be formed in a plate shape with the curved surface 73, and installed at both sides of the rotating frame 27. The screw rotating shaft 34 of the screw 30 may be installed through the center of the compensation member 72, and the compensation member 72 may be installed in a bilateral symmetrical shape with respect to the rotating frame 27.

As illustrated in FIGS. 2 and 3, the inclination guide member 75 may have an inclined surface 76 formed at a position facing the curved surface 73, and be installed outside the screw 30 while facing the compensation member 72. The inclined surface 76 formed toward the compensation member 72 may have a V-shape, and the curved surface 73 of the compensation member 72 may compensate for the coaxiality of the screw rotating shaft 34 while abutting the inclined surface 76.

The elastic deformation member 78 may be installed between the compensation member 72 and the rotating frame 27, made of an elastically deformed material, and formed in a plate shape. The elastic deformation member 78 may be installed in contact with the side surface of the rotating frame 27, and the compensation member 72 and the inclination guide member 75 may be sequentially installed outside the elastic deformation member 78. The installation of the compensation part 70 may compensate for the right angle degree between the center axis of the screw 30 and the vertical surface of the rotating frame 27, which the elastic deformation member 78 abuts.

The installation of the compensation part 70 may compensate for the right angle degree of the screw rotating shaft 34 assembled into the rotating frame 27 of the motor 20. Since the shapes of the compensation member 72 and the inclination guide member 75 compensate for the right angle degree between the screw rotating shaft 34 and one side of the rotating frame 27 (right side in FIG. 1), the operation reliability of the device can be improved.

When the compensation member 72 forms a virtual circle around the portion where the screw rotating shaft 34 is spline-joined to the rotating frame 27, the curved surface 73 of the compensation member 72 may form a curved surface corresponding to the virtual circle.

That is, the center of the portion where the screw 30 is spline-joined to the rotating frame 27 may become the centripetalism point of the compensation part 70. The spherical shape may be deformed by tolerances of the respective parts of the motor 20 and the compensation part 70, but the elastic deformation member 78 may compensate for the tolerances of the respective parts of the motor 20 and the compensation part 70, thereby forming a perfect circle shape. The inclination guide member 75 may be assembled with each of the compensation members 72 installed outside the screw rotating shaft 34, the curved surface 73 of the compensation member 72 may slip along the inclined surface 76 formed on the inclination guide member 75, and the inclination guide member 75 may compensate for the position of the screw 30 such that the screw rotating shaft 34 of the screw 30 into which the inclination guide member 75 is assembled is coaxial with the rotation center of the motor rotating part 26 and the fixed piston 60.

The axial load of the screw 30 may be sequentially transferred to the inclination guide member 75, the compensation member 72, the elastic deformation member 78 and the motor rotating part 26. Since the installation of the compensation part 70 provides a structure capable of performing active axial compensation among the respective parts when the master cylinder 1 of the brake for the vehicle is operated, the system efficiency can be improved.

The locking member 80 may be fixed to the screw 30 protruding to the outside of the rotating frame 27, and positioned outside the compensation part 70. The locking member 80 may be installed in such a manner that the inclination guide member 75 abuts the locking member 80 and the compensation member 72 abuts the inclination guide member 75. Between the compensation member 72 and the rotating frame 27, the elastic deformation member 78 may be installed.

The elastic deformation members 78, the compensation members 72 and the inclination guide members 75 may be symmetrically installed with the rotating frame 27 provided therebetween. The inclination guide member 75 installed in the rotating frame 27 may abut an end of the screw body 32. The compensation member 72 may be installed so as to abut the inclination guide member 75, and the elastic deformation member 78 may be installed between the compensation member 72 and the rotating frame 27.

The guide part 90 may be positioned in the motor rotating part 26, and formed in various shapes as long as the guide part 90 can constrain the rotation of the moving piston 50 and allow the moving piston 50 to linearly move in the longitudinal direction. In an embodiment, the guide part 90 may include a guide body 92 and a wing member 94.

The guide body 92 may form a groove into which the wing member 94 is inserted so as to move in the longitudinal direction. The guide body 92 may be positioned outside the moving piston 50, and fixed to the housing 10.

The wing member 94 may be fixed to the outside of the moving body 52, formed in a shape protruding to the outside of the moving body 52, and moved with the moving body 52. One side of the wing member 94 may be fixed to the moving body 52, and the other side may be inserted into the guide body 92.

The rotation of the wing member 94 fixed to the moving body 52 of the moving piston 50 may be constrained by the guide body 92 when the screw 30 is rotated. Thus, the moving body 52 may serve to decide the position of the piston member 54 while linearly moved.

That is, in order to implement the required braking pressure of the driver, the motor 20 may rotate the screw 30, and the moving body 52 may decide the position of the piston member 54 while linearly moved. Therefore, the magnitude of the braking pressure of the master cylinder 1 of the brake for the vehicle may be controlled, and the sealing member 56, the fixed piston 60 and the housing 10 which are assembled to the respective components may seal the space in which the braking pressure is formed.

Hereafter, the operation of the master cylinder 1 of a brake for a vehicle in accordance with the embodiment of the present invention will be described in detail with reference to the accompanying drawings.

When the magnetism of the stator 24 is changed to implement braking pressure required by a driver, the motor rotating part 26 may be rotated with the rotor 28. The motor rotating part 26 may rotate the spline-joined screw 30, and the rotation of the screw 30 may linearly move the moving piston 50 in the longitudinal direction of the housing 10.

The moving piston 50 facing the screw 30 may be allowed only to linearly move because the wing member 94 protruding to the outside of the moving piston 50 is inserted into the guide body 92 and constrained from rotating.

The braking pressure may be formed by the movement of the moving piston 50 having the piston member 54, and the oil to form the braking pressure may be transferred through the port 12.

While the curved surface 73 of the compensation member 72 is moved along the inclined surface 76 of the inclination guide member 75, the coaxiality of the screw 30 may be compensated for. Furthermore, the compensation gap 40 between the screw 30 and the rotating frame 27 may also compensate for the coaxiality of the screw 30. Furthermore, since the coaxiality of the screw 30 is compensated for while the shape of the elastic deformation member 78 is deformed, the rotation centers of the fixed piston 60, the screw 30 and the rotating frame 27 may be positioned on the same axis.

In accordance with the embodiment of the present invention, the hydraulic pressure may be formed while the moving piston 50 is moved by the operation of the motor 20, which makes it possible to precisely implement braking pressure. Furthermore, the compensation part 70 and the compensation gap 40 can compensate for the coaxiality and right angle degree between the moving piston 50 and the screw 30 which are positioned on the same axis as the rotation center axis of the motor rotating part 26, thereby improving the operation reliability. Furthermore, since the moving piston 50 also performs the function of the conventional piston, the external size of the device can be reduced to increase the spatial utilization, and the number of parts can be reduced to improve productivity.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A master cylinder of a brake for a vehicle, comprising:
   a housing having a port through which oil is transferred;
   a motor connected to the housing so as to supply rotary power;
   a screw rotatably installed in the motor, and rotated by the rotary power received from the motor;
   a moving piston engaged with the screw, and moved in the longitudinal direction of the housing by the rotation of the screw; and
   a fixed piston fixed to the inside of the housing,
   wherein the motor comprises:
      a fixed part fixed to the housing and having magnetism changed by power supply; and
      a motor rotating part connected to the screw, rotated with the screw, and rotated according to the change in magnetism of the fixed part,
   wherein the motor rotating part comprises:
      a rotating frame rotatably installed in a fixed frame of the fixed part, and installed in a shape to cover an end of the moving piston; and
      a rotor installed outside the rotating frame facing the fixed part, and having magnetism,
   wherein the screw comprises a screw body and a screw rotating shaft that is connected to the screw body and comprising a spline shaft portion, and the motor rotating part comprises a spline hole portion configured to receive the spline shaft portion such that rotation power is transmitted from the motor rotating part to the screw rotating shaft,
   wherein a compensation gap is provided between the spline hole portion of the rotating frame and the spline shaft portion of the screw such that the spline shaft portion is movable in a top-to-bottom direction within the spline hole portion.

2. The master cylinder of claim 1,
   wherein the fixed frame is fixed to one side of the housing; and
   wherein the fixed part further comprises: a stator installed in the fixed frame facing the motor rotating part, and configured to generate magnetism.

3. The master cylinder of claim 2, further comprising a compensation part installed outside the screw passing through the rotating frame.

4. The master cylinder of claim 3, wherein the compensation part comprises:
   a compensation member positioned outside the screw and having a surface facing the rotating frame and a surface which does not face the rotating frame, wherein the surface facing the rotating frame is a flat surface and the surface which does not face the rotating frame forms a curved surface; and an inclination guide member having an inclined surface formed at a position facing the curved surface, and installed outside the screw while facing the compensation member.

5. The master cylinder of claim 4, wherein the compensation part further comprises an elastic deformation member installed between the compensation member and the rotating frame and formed of an elastically deformable material.

6. The master cylinder of claim 3, further comprising a locking member fixed to the screw protruding to the outside of the rotating frame, and positioned outside the compensation part.

7. The master cylinder of claim 6, wherein the screw comprises:

a screw body rotatably installed in the rotating frame and having a spiral gear formed on the outside thereof; and a screw rotating shaft extended from the screw body, passed through the compensation part and the rotating frame, and having the locking member fixed to the outside thereof.

8. The master cylinder of claim 7, wherein the moving piston comprises:

a moving body installed in a shape to cover the outside of the screw body, and linearly moved by rotation of the screw body; and a piston member connected to the moving body extended to the inside of the housing, and configured to move oil between the housing and the fixed piston toward the port.

9. The master cylinder of claim 1, wherein the fixed piston is positioned on the same axis as the screw, and has one side positioned in the moving piston and the other side fixed to the housing.

10. The master cylinder of claim 1, further comprising a compensation coupling configured to couple the screw rotating shaft and the motor rotating part, wherein the compensation coupling comprises:

a first inclination guide member, a first compensation member, a first elastic deformation member, a second elastic deformation member, a second compensation member, a second inclination guide member and a locking member that are arranged in order from the screw body along an axis of the screw, wherein the first inclination guide member, the first compensation member and the first elastic deformation member are located between the screw body and the motor rotating part, wherein the second elastic deformation member, the second compensation member and the second inclination guide member are located between the motor rotating part and the locking member, wherein the motor rotating part is interposed between the first and second elastic deformation members, wherein the first inclination guide member comprises a first inclined surface facing the motor rotating part and inclined with respect to the axis, and the first compensation member comprises a first rounded surface facing to and contacting the first inclined surface for allowing the first compensation member to slip with respect to the first inclination guide member, wherein the second inclination guide member comprises a second inclined surface facing the motor rotating part and inclined with respect to the axis, and the second compensation member comprises a second rounded surface facing to and contacting the second inclined surface for allowing the second compensation member to slip with respect to the second inclination guide member.

* * * * *